United States Patent [19]
Danberg

[11] 3,923,289
[45] Dec. 2, 1975

[54] METHOD OF MIXING SOLIDS AND LIQUIDS ON A CONTINUOUS BASIS

[76] Inventor: Victor Danberg, 6 Mary Ann Lane, Wallingford, Conn. 06493

[22] Filed: Dec. 13, 1971

[21] Appl. No.: 207,173

[52] U.S. Cl. ................................ 259/22; 259/41
[51] Int. Cl.² ................................ B01F 5/12
[58] Field of Search ............ 259/9, 10, DIG. 30, 95, 259/96, 2, 5, 6, 7, 8, 21–26, 40–46; 415/116, 206, 213

[56] References Cited
UNITED STATES PATENTS

| | | | |
|---|---|---|---|
| 2,230,146 | 1/1941 | Myers | 259/9 |
| 2,498,209 | 2/1950 | Iredale | 259/DIG. 30 |
| 3,454,263 | 7/1969 | Galle | 259/9 |
| 3,663,117 | 5/1972 | Warren | 415/116 |
| 3,679,182 | 7/1972 | Clocker | 259/9 |
| 3,682,447 | 8/1972 | Zucker | 259/DIG. 30 |

Primary Examiner—Robert W. Jenkins

[57] ABSTRACT

The invention relates to a method of quick, efficient and continuous mixing of large with small quantities of solids with solids, solids with liquids, and multiple variations of these mixtures. The method consists of feeding the larger portion of the solid material into a high pressure suction fan at its inlet opening, and feed the smaller portions of other materials into a smaller opening on the periphery of the fan wheel for mixing.

8 Claims, 2 Drawing Figures

INVENTOR
Victor Danberg

METHOD OF MIXING SOLIDS AND LIQUIDS ON A CONTINUOUS BASIS

The object of the invention is to provide a system of mixing the fibrous portion of the processed solid waste trash with adhesive for pressure molding into useful articles. (Refer Patent Pending, "Useful Article")

The object of the invention is to provide a method of mixing the processed solid waste trash fiber with oil, coal, or gas for combustion mixture as fuel.

The object of the invention is to be able to react solid waste fibers with chemicals to increase their adherence by adhesive treatments in mixtures with waste rubber.

(For the sake of brevity all Patent Pending references will be abreviated. The following Patent Specification Titles will be shortened.)

From: "A Process to Convert Solid Waste into a Raw Material Suitable for Useful Articles and Other Uses."

To: "Useful Articles."

Test were made with a high pressure suction fan, which had an open fan wheel 18 inch diameter, 4 inches wide and driven by a 3 H.P. motor at 1750 R.P.M.

Figure 2:
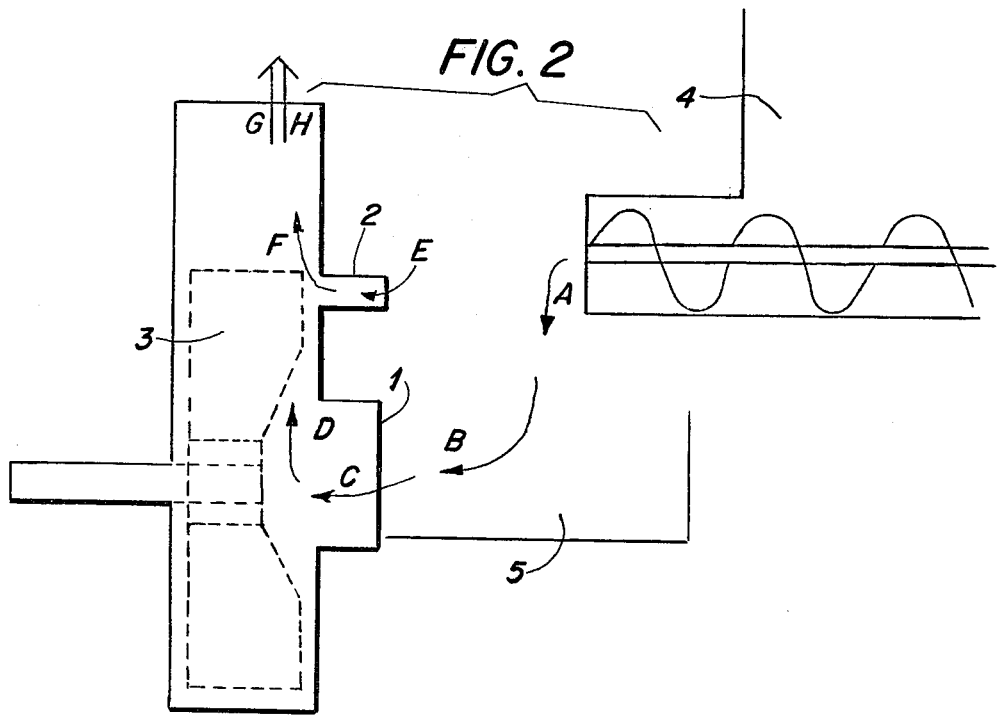
FIG. 2 is a side view of the fan assembly showing the inputs thereto.

Referring to FIG. 2, a hopper number 4, with a 6 inch screw conveyor powered by a variable speed motor, feeds large volume of the solid material into inlet number 1, via feeding trough number 5. To feed smaller volume of solids into inlet number 2, a very small screw conveyor powered by a variable speed motor was used. Liquids were fed into the fan by gravity. The flow of the materials follow arrows, A-B-C, additional materials follow arrow E, meet at arrow F, and come out mixed together as arrow, GH.

When the solid materials enter the fan inlet, No. 1, the open vanes of the wheel have a tendency to spread the mass into an open disperse state. When the liquid or solid enters the periphial fan feed inlet, at number 2, the high speed at the tips of the fan wheel atomizes the liquid or solid into a spray or open dust particles. The small droplets or dust like particles are evenly diffused throughout the open solids at the fan wheel tips. The force of moving air constantly sweeps out the mixtures, making room for the following mixing operations.

Tests were made on mixing fiber flock with both solids, liquids, and mixtures of both. There is a limit to the amount of liquid that can be added to such mixtures. The critical point is reached when the greater volume of solids become too moist to be moved by the fan wheel. This point can vary with different solids. The results of the tests show that all trial runs resulted in uniform mixtures.

TABLE I

| Trials | Large Amount of Solid Material Inlet 1 | Small Amount of Solid Material Inlet 2 | Small Amount of Liquid Material Inlet 2 | Results |
|---|---|---|---|---|
| 1 | 50 lbs. white flock | | 1 quart black dye solution | Areas of small grey spots uniformly dispersed throughout the white flock. |
| 2 | 50 lbs. white flock | | 6 quarts black dye solution | Flock moist and uniformly spotted with grey color |
| 3 | 50 lbs. white flock | 1 lb. red pigment | | Dry red pigments particles uniformly mixed throughout the white flock. |
| 4 | 50 lbs. white flock | 5 lbs. black flock | | Black flock uniformly mixed throughout the white flock. |
| 5 | 50 lbs. white flock | 5 lbs. black flock | 6 quarts yellow dye solution | Moist white flock is uniformly spotted with yellow color, and uniformly mixed with moist black flock fibers. |

TABLE II

| Trials | Inlet 1 | Inlet 1 | Inlet 2 | Results |
|---|---|---|---|---|
| 1 | 50 lbs. white flock | 50 lbs. yellow flock | | Homogeneous mixtures of white and yellow flock |
| 2 | 50 lbs. white flock | 50 lbs. yellow flock | 10 quarts black dye solution | Homogeneous mixture of moist white and yellow flock uniformly spotted with grey color. |

Figure 1:
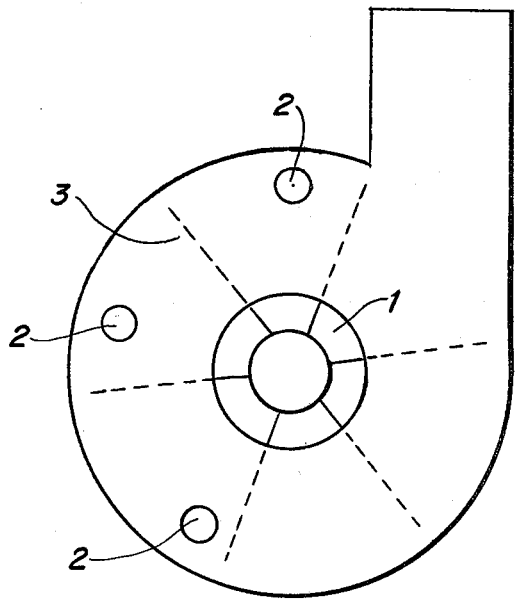
FIG. 1 is an end view of the fan assembly.

Referring to FIG. 1, number 1, represents the inlet opening of the fan. Number 2, represents the smaller opening into the periphery of the fan blade tips. Number 3, represents the open paddle type of fan rotor. Liquid was fed into opening, number 2, by gravity. Increasing or decreasing the height of the container, adjusted the flow. A more precise method of volumetric feeding is recommended.

Referring to table II, when there are two large volumes of solids entering the inlet 1, they should be conveyed into the inlet 1, according to the ratios desired for the final mixture. In the case of trial run 1, of table II, both solid were conveyed in equal amounts into the inlet 1. In mixing small amounts of solids with large amounts of solids, the point of entry for the small amounts would be inlet 2. All the liquids are most advantageously dispersed by feeding into the inlet 2.

One of the main purposes of the invention, is to provide an easy method of mixing large quantities of fiber, recovered from solid waste ground trash, with both solid and liquid adhesive. (Reference Patent Pending, "Useful Articles.") Such compositions could be pressure molded into useful articles. The invention provides a simple and efficient method for the continuous mixing in any quantity. The invention is quickly serviceable to changes from solids to liquids without any extensive equipment. The invention's method of mixing is very adaptable to the great amount of variations found in such processed solid waste trash fibers, by the simple adjustments of amount fed into inlets.

An example of the versatility of the mixing invention is illustrated in the following manner. In the event of a small bulk fiber factor, wherein a small volume of recovered solid waste fibers have a large weight, the inlet periphey adhesive feed can easily and instantly be reduced. In this manner, proportions of the physical mixture remains proper. There would not be any excessive amount of adhesive for the smaller volume amount, but heavier fibers. In the event of a high bulk fiber factor, wherein a large volume of recovered solid waste fibers have a small weight, it would be necessary to increase the inlet feed of adhesive. This increase of adhesive is necessary for the large volume amounts, but lighter weight of fiber, to attain proper physical proportion of full adhesion.

In both cases, the operator can be instantly aware of these changes. The operator can make the adjustments immediately. The operator can either reduce the main inlet feed at number 1, or increase the periphey feed at number 2, or vice versa. In this manner, the amount of defective finished products are reduced, and needless amounts of adhesive are not used.

A very important feature of the mixer invention, is the ability to use either solid or liquid adhesives without a multitude of attachments. The invention is particularly suited for mixing recovered waste trash fibers. The invention is also suited for mixing either solid or liquid adhesive wastes with the recovered waste trash fibers. The supply of such waste adhesives cannot either be relied upon or predicted. The mixer must be able to utilize whatever type of waste adhesives are available. When such types of waste adhesives become scarce in supply, the mixer must be able to cope with any type of low cost adhesive on sale in the market. The mixer invention can be employed to work under any of these adhesive situation. The mixer invention can respond instantly to any variation or condition in all the commodities that could be used.

The invention's method can easily be expanded for larger or smaller volumes of production. There is also the added feature of such a mixer, in being able to act as a conveyor. At the same time of mixing, the fan mixer can blow the mixture to the desired point.

The practicability of the invention's method of utilizing processed solid waste fibers for mixing with coal, oil, or gas for fuel is very apparent. With this method, the fuels could be mixed at the burning site at the proper proportion for any desired rate of combustion. The invention of the fan mixer has an additional feature being able to blow the fuel fiber mixture into the combustion chamber. It would not be practical to storage such mixtures prior to combustion. Aside from a storage problem, the added cost of feeding such a prepared and stored mixture to the combustion chamber may make such fuel mixture too costly.

The conveying aspect of the mixer brings the additional advantage of being able to simultaneously mix materials, in the blown air stream of the fan mixer. Materials could be mixed in the invention mixer, and a second liquid or solid mixture can be added in the open air stream. Such options can give the fan mixer many versatile qualities. This is very similar to the method used in the inventor's Patent 3,201,047 in mixing sprayed flock with water.

In mixing recovered solid waste fibers with rubber tire scrap, it would be helpful to treat the recovered waste fibers with chemicals. There are many patented process describing such chemicals. These treatments would increase the adhesive qualities of the fiber to the rubber. The processed fiber can be treated with either solid or liquid chemicals in one fan mixer. If there is a requirement for a secondary reaction, the mixture can be blown into a second fan mixer for the second phase. There is no limit to the variation in quantities that could be accomplished with a sequence of fan mixers. In this manner a process advantage is achieved with a little effort. The treated fibers could adhere better in rubber mixtures.

The invention of fan mixing can provide a method of mixing for the utilizations of recovered solid waste trash fibers. The ground trash fiber are of such variable compositions, that it would require such a mixer to cope instantly with any problem arising in its mixing processing. The fan mixing invention is another part of the process method of converting recovered solid waste fibers into useful articles. The invention can be another step in the solution of solid waste disposal.

I claim:

1. A method of mixing materials on a continuous basis, comprising the steps of feeding a larger portion of fibrous material into the center suction point of a high pressure open fan assembly, and feeding a smaller portion of materials into another inlet point located on the periphery of the same fan housing assembly and leading into the tips of the open fan rotor blades.

2. A method of mixing materials on a continuous basis, comprising the steps of feeding a larger portion of solid materials into the center suction point of a high pressure open fan assembly, and feeding a smaller portion of liquid material into another inlet point located on the periphery of the same fan housing assembly and leading into the tips of the open fan rotor blades.

3. A method of mixing materials on a continuous basis, comprising the steps of feeding a larger portion of solid materials into the center suction point of a high pressure open fan assembly, and feeding a smaller portion of solid material into another inlet point located on the periphery of the same fan housing assembly and leading into the tips of the open fan rotor blades.

4. A method of mixing materials on a continuous basis, comprising the steps of feeding a larger portion of solid materials into the center suction point of a high pressure open fan assembly, and feeding a smaller portion of at least two different liquid materials into different inlet points located on the periphery of the same fan housing assembly and leading into the tips of the open fan rotor blades.

5. A method of mixing materials on a continuous basis, comprising the steps of feeding a larger portion of solid materials into the center suction point of a high pressure open fan assembly, and feeding a smaller portion of at least two different solids into different inlet points located on the periphery of the same fan housing assembly and leading into the tips of the open fan rotor blades.

6. A method of mixing materials on a continuous basis, comprising the steps of feeding a larger portion of solid materials into the center suction point of a high pressure open fan assembly, and feeding a smaller portion of a liquid material and another solid material into two different inlet points located on the periphery of the same fan housing assembly and leading into the tips of the open fan rotor blades.

7. A method of mixing materials on a continuous basis, comprising the steps of feeding a larger portion of solid materials into the center suction point of a high pressure open fan assembly, and feeding a smaller portion of two different liquid materials and an additional solid material into three different inlet points located on the periphery of the same fan housing assembly and leading into the tips of the open fan rotor blades.

8. A method of mixing materials on a continuous basis, comprising the steps of feeding a larger portion of solid materials into the center suction point of a high pressure open fan assembly, and feeding a small portion of two different solid materials and an additional liquid material into three different inlet points located on the periphery of the same fan housing assembly and leading into the tips of the open fan rotor blades.

* * * * *